(12) United States Patent
Sasaki et al.

(10) Patent No.: US 9,012,551 B2
(45) Date of Patent: Apr. 21, 2015

(54) RUBBER COMPOSITION AND MOLDED RUBBER PRODUCTS

(75) Inventors: Katsuaki Sasaki, Iwata (JP); Shohei Fukama, Iwata (JP); Takashi Kaneike, Osaka (JP); Yasuhiko Kojima, Osaka (JP)

(73) Assignees: NTN Corporation, Osaka (JP); Nakanishi Metal Works Co., Ltd., Osaka (JP)

(*) Notice: Subject to any disclaimer, the term of this patent is extended or adjusted under 35 U.S.C. 154(b) by 214 days.

(21) Appl. No.: 13/702,743

(22) PCT Filed: Jun. 8, 2010

(86) PCT No.: PCT/JP2010/059681
§ 371 (c)(1),
(2), (4) Date: Feb. 15, 2013

(87) PCT Pub. No.: WO2011/155025
PCT Pub. Date: Dec. 15, 2011

(65) Prior Publication Data
US 2013/0158181 A1 Jun. 20, 2013

(51) Int. Cl.
C04B 28/14 (2006.01)
C08K 3/26 (2006.01)
A63B 37/00 (2006.01)
C08K 3/18 (2006.01)
C08K 3/00 (2006.01)
C08K 3/22 (2006.01)
C08K 3/30 (2006.01)

(52) U.S. Cl.
CPC ............... *C08K 3/26* (2013.01); *C08K 3/0033* (2013.01); *C08K 3/22* (2013.01); *C08K 3/30* (2013.01)

(58) Field of Classification Search
CPC .............. C08K 3/26; C08K 3/22; C08K 3/30
USPC .................................. 524/423, 426, 433, 430
See application file for complete search history.

(56) References Cited

U.S. PATENT DOCUMENTS

| 4,189,418 A * | 2/1980 | Ueno et al. ...................... 524/52 |
| 5,852,093 A | 12/1998 | Aimura et al. |
| 2004/0067380 A1 | 4/2004 | Maeda et al. |
| 2005/0249964 A1 | 11/2005 | Nakajima et al. |
| 2008/0103287 A1 * | 5/2008 | Chino et al. .................. 528/421 |
| 2009/0186986 A1 * | 7/2009 | Nomura et al. ............ 525/326.3 |

FOREIGN PATENT DOCUMENTS

| EP | 0 795 580 A1 | 9/1997 |
| JP | 06-050346 A | 2/1994 |
| JP | 11-279284 A | 10/1999 |
| JP | 2001-214152 A | 8/2001 |
| JP | 2003-1762 A | 1/2003 |
| JP | 2003-287040 A | 10/2003 |
| JP | 2005-180575 A | 7/2005 |
| JP | 2005-321057 A | 11/2005 |
| JP | 2007-039557 A | 2/2007 |
| JP | 2007-332344 A | 12/2007 |
| JP | 2008-163989 A | 7/2008 |
| JP | 2008-179663 A | 8/2008 |
| JP | 2010-159377 A | 7/2010 |
| WO | 96/17015 A1 | 6/1996 |

OTHER PUBLICATIONS

Official Communication issued in corresponding European Patent Application No. 10852865.4, mailed on Oct. 10, 2013.
Official Communication issued in International Patent Application No. PCT/JP2010/059681, mailed on Jul. 6, 2010.
Official Communication issued in corresponding Japanese Patent Application No. 2009-004549, mailed on Mar. 19, 2013.

* cited by examiner

*Primary Examiner* — William Cheung
(74) *Attorney, Agent, or Firm* — Keating & Bennett, LLP

(57) ABSTRACT

To provide a rubber composition capable of sufficiently abrading a sealing lip while sliding it in an initial stage of rotation and sufficiently reducing a running torque, and further capable of securing a sufficient sealing property. The composition includes a first compounding ingredient which is one or more kinds selected from the group consisting of calcium carbonate, magnesium oxide, aluminum oxide and barium sulfate in an amount of 50 to 200 parts by mass based on 100 parts by mass of a rubber component, and a second compounding ingredient which is one or two kinds selected from the group consisting of carbon black and a silica in an amount of more than 0 parts by mass and 50 parts by mass or lower.

10 Claims, No Drawings

RUBBER COMPOSITION AND MOLDED RUBBER PRODUCTS

This application is the U.S. National Phase under 35 U.S.C. Section 371 of International Application PCT/JP2010/059681, filed Jun. 8, 2010.

TECHNICAL FIELD

The present invention relates to a rubber composition which is used as, for example, a material for sealing a bearing, and the like.

BACKGROUND ART

As a bearing in a transmission system of a car, for example, a closed rolling bearing is used. As this closed rolling bearing, for example, a structure is known in which multiple rolling elements are arranged between an inner ring raceway and an outer ring raceway, a seal groove is formed at both sides of the inner ring raceway in a circumferential direction, and a locking groove is formed, in the circumferential direction, at both sides of an inner circumferential surface of the outer ring raceway facing the seal groove, wherein a circular rubber seal is put in the locking groove, and a sealing lip of the tip of the rubber seal is arranged so that it is in sliding contact with a side wall of the seal groove (see Patent Documents 1 and 2). The sliding-contact arrangement of the sealing lip, as described above, can prevent both leakage of a lubricant in the bearing and contamination from the outside.

In reaction to recent, increased desire for reduction of environmental burdens and lower fuel consumption, a running torque of the bearing used in the transmission system of a car is required to be lower than that of conventional bearings, and also as the rubber seal put in the bearing, a rubber seal capable of providing a lower torque is required accordingly.

In order to respond to such a requirement for obtaining a lower torque, it can be considered to adopt a method for reducing a running torque by contriving the shape of the sealing lip thereby reducing the rigidity, or a method for reducing a running torque by decreasing a jamming of the rubber seal. According to these methods, however, a shape of the sealing lip is limited and sizes of the seal vary, and the operation and maintenance are problematically difficult, taking account of assembly.

It is proposed to use a rubber seal reducing a running torque due to decrease of a jamming caused by an initial abrasion of the sealing lip while it is slid in an early stage of rotation (see Patent Document 3).

PRIOR ART DOCUMENTS

Patent Documents

Patent Document 1: Japanese Unexamined Patent Application Publication No. 2005-180575 (Figure 1, Figure 2, and the like)
Patent Document 2: Japanese Unexamined Patent Application Publication No. 2008-163989
Patent Document 3: Japanese Unexamined Patent Application Publication No. 2003-287040

SUMMARY OF INVENTION

Technical Problem

When this seal is produced experimentally using a general rubber material which has been conventionally used for the rubber seal and tested, however, it has been found that it is difficult to reduce the running torque to a sufficient level, though the effect of slightly reducing the running torque is observed.

In view of such a technical background, the present invention has been made, and aims at providing a rubber composition capable of sufficiently abrading the sealing lip while it is slid in an early stage of rotation and thus sufficiently reducing the running torque, and further capable of securing sufficient sealing properties.

Solution to Problem

In order to attain the object described above, the present invention provides the following measures.

[1] A rubber composition including a first compounding ingredient which is one or more kinds selected from the group consisting of calcium carbonate, magnesium oxide, aluminum oxide and barium sulfate in an amount of 50 to 200 parts by mass based on 100 parts by mass of a rubber component, wherein the composition does not include carbon black nor a silica.

[2] A rubber composition including a first compounding ingredient which is one or more kinds selected from the group consisting of calcium carbonate, magnesium oxide, aluminum oxide and barium sulfate in an amount of 50 to 200 parts by mass based on 100 parts by mass of a rubber component, and a second compounding ingredient which is one or two kinds selected from the group consisting of carbon black and a silica in an amount of more than 0 parts by mass and 50 parts by mass or lower.

[3] The rubber composition according to the item 1 or 2, wherein the barium sulfate is used as the first compounding ingredient.

[4] A molded rubber product which is formed by cross-linking the rubber composition according to any one of the items 1 to 3.

[5] A seal for a bearing which is formed by cross-linking the rubber composition according to any one of the items 1 to 3.

Advantageous Effect of Invention

The invention of [1] has a constituent feature in which a first compounding ingredient (a component having a low reinforcing effect), which is one or more kinds selected from the group consisting of calcium carbonate, magnesium oxide, aluminum oxide and barium sulfate, is included in an amount of 50 to 200 parts by mass based on 100 parts by mass of a rubber component (i.e., included in a large amount), and neither carbon black nor a silica, which are reinforcements having a high reinforcing effect, is included. A sealing lip, for example, formed from this rubber composition, therefore, can be sufficiently abraded while it is slid in an initial stage of rotation, thereby decreasing a jamming or forming a slight gap (for example, 50 μm or less) between the sealing lip and a side wall of a seal groove, thus resulting in sufficient reduction of the running torque, and further the sufficient sealing property and the sufficient strength can be obtained.

The invention of [2] has a composition in which a first compounding ingredient (a component having a low reinforcing effect), which is one or more kinds selected from the group consisting of calcium carbonate, magnesium oxide, aluminum oxide and barium sulfate, is included in an amount of 50 to 200 parts by mass based on 100 parts by mass of a rubber component (i.e., included in a large amount), and a second compounding ingredient (a reinforcement having a high reinforcing effect), which is one or two kinds selected from the group consisting of carbon black and a silica, is included in an amount of more than 0 parts by mass and 50 parts by mass or lower (i.e., included in a small amount). A sealing lip, for example, formed from this rubber composition, therefore, can be sufficiently abraded while it is slid in an initial stage of rotation, thereby decreasing a jamming or forming a slight gap (for example, 50 μm or less) between the sealing lip and a side wall of a seal groove, thus resulting in sufficient reduction of the running torque, and further sufficient sealing property and sufficient strength can be obtained.

In the invention of [3], because the barium sulfate is used as the first compounding ingredient, the sealing lip can be more sufficiently abraded while it is slid in an initial stage of rotation, and the running torque can be further reduced.

In the molded rubber product of the invention [4], for example, a sealing lip can be sufficiently abraded while it is slid in an initial stage of rotation, thereby sufficiently reducing the running torque.

In the seal for a bearing of the invention [5], a sealing lip can be sufficiently abraded while it is slid in an initial stage or rotation, and thus the running torque can be sufficiently reduced, and sufficient sealing property and sufficient strength can also be secured.

DESCRIPTION OF EMBODIMENTS

A first invention is a composition including a first compounding ingredient which is one or more kinds selected from the group consisting of calcium carbonate, magnesium oxide, aluminum oxide and barium sulfate in an amount of 50 to 200 parts by mass based on 100 parts by mass of a rubber component, wherein the composition does not include carbon black nor a silica.

The first invention described above has a constituent feature in which the first compounding ingredient having a low reinforcing effect is included in an amount of 50 to 200 parts by mass based on 100 parts by mass of the rubber component (i.e., included in a large amount), and neither the carbon black nor the silica, which are reinforcements having a high reinforcing effect, is included. A sealing lip, for example, formed from this rubber composition, therefore, can be sufficiently abraded while it is slid in an initial stage of rotation, thereby decreasing a jamming or forming a slight gap (for example, 50 μm or less) between the sealing lip and a side wall of a seal groove, thus resulting in sufficient reduction of the running torque. As a result, the running torque can be reduced to a level equal to that of seals for general contactless bearings, and the sufficient sealing property can be secured. In addition, sufficient strength required for sealing materials can also be secured.

A second invention is a composition including a first compounding ingredient which is one or more kinds selected from the group consisting of calcium carbonate, magnesium oxide, aluminum oxide and barium sulfate in an amount of 50 to 200 parts by mass based on 100 parts by mass of a rubber component, and a second compounding ingredient which is one or two kinds selected from the group consisting of carbon black and a silica in an amount of more than 0 parts by mass and 50 parts by mass or lower.

The second invention described above has a composition in which the first compounding ingredient having a low reinforcing effect is included in an amount of 50 to 200 parts by mass based on 100 parts by mass of the rubber component (i.e., contained in a large amount), and the second compounding ingredient, which is the reinforcement having a high reinforcing effect, is included in an amount of more than 0 parts by mass and 50 parts by mass or lower (i.e., contained in a small amount). A sealing lip, for example, formed from this rubber composition, therefore, can be sufficiently abraded while it is slid in an initial stage of rotation, thereby decreasing a jamming or forming a slight gap (for example, 50 μm or less) between the sealing lip and a side wall of a seal groove, thus resulting in sufficient reduction of the running torque. As a result, the running torque can be reduced to a level equal to that of seals for general contactless bearings, and the sufficient sealing property can be secured. In addition, sufficient strength required for sealing materials can also be secured.

In the first and the second inventions, the blending ratio of the first compounding ingredient, which is one or more kinds selected from the group consisting of calcium carbonate, magnesium oxide, aluminum oxide and barium sulfate, is set as from 50 to 200 parts by mass based on 100 parts by mass of the rubber component. When the amount is less than 50 parts by mass, processability is reduced, and a problem occurs in which the sealing lip cannot be sufficiently abraded while it is slid. When it is more than 200 parts by mass, the processability is reduced, and a problem occurs in which the sealing lip cannot be sufficiently abraded while it is slid. It is especially preferable to include the first compounding ingredient in an amount of 100 to 200 parts by mass based on 100 parts by mass of the rubber component.

In the second invention, the blending ratio of the second compounding ingredient, which is one or two kinds selected from the group consisting of carbon black and a silica, is set as from more than 0 parts by mass and 50 parts by mass or lower based on 100 parts by mass of the rubber component. When the amount is more than 50 parts by mass, the reinforcing effect becomes too strong, thus resulting in insufficient abrasion of the sealing lip while it is slid in an initial stage of rotation, and insufficient reduction of the running torque. It is especially preferable to include the second compounding ingredient in an amount of 10 to 40 parts by mass based on 100 parts by mass of the rubber component.

In the second invention, when the carbon black is used as the second compounding ingredient, a composition is preferable which includes the first compounding ingredient in an amount of 50 to 200 parts by mass, based on 100 parts by mass of the rubber component, and the carbon black in an amount of 5 to 30 parts by mass.

In the second invention, when the silica is used as the second compounding ingredient, a composition is preferable which includes the first compounding ingredient in an amount of 50 to 200 parts by mass, based on 100 parts by mass of the rubber component, and the silica in an amount of 5 to 50 parts by mass.

The rubber component is not particularly limited, and may include, for example, acrylic rubber, NBR, EPDM, silicone rubber, fluororubber, and the like.

As the first compounding ingredient, one or more ingredients selected from the group consisting of calcium carbonate, magnesium oxide, aluminum oxide and barium sulfate can be used. Of these, it is preferable to use the barium sulfate. In such a case, sufficient abrasion can be performed by sliding in an initial stage of rotation.

The rubber composition of the present invention may include various additives such as a silane coupling agent, a plasticizer and a lubricant.

The silane coupling agent is not particularly limited, and may include, for example, vinyl silane coupling agents, aminosilane coupling agents, epoxysilane coupling agents, mercaptosilane coupling agents, and the like.

The plasticizer is not particularly limited, and may include, for example, mineral oil, ether oil, silicone oil, fluorine-contained oil, polyolefin oil, and the like.

The lubricant is not particularly limited, and may include, for example, petroleum wax (paraffin wax, microcrystalline wax, and the like), ester wax, stearoylamino wax, polyethylene, carnauba, and the like.

In the present invention, when the acrylic rubber is used as the rubber component, the cross-linking agent is not particularly limited, and it is preferable to use an epoxy cross-linking agent, a soap-sulfur cross-linking agent. When the epoxy cross-linking agent and/or the soap-sulfur cross-linking agent is used, a cross-linking density in the molded rubber product is lower compared to a case in which e.g., a triazine cross-linking agent, a carboxyl cross-linking agent, or a peroxide cross-linking agent is used, due to a low cross-linking efficiency. As a result, an effect can be obtained in which molded rubber product is further abraded while it is slid in an initial stage of rotation.

Preferably, a secondary vulcanization is not performed.

When the rubber composition of the present invention is prepared, the blending order of the ingredients is not particularly limited. It is enough to use a known kneading device such as a mixing roll or a sealing kneader for mixing them. After that, molding such as sheet-molding is performed, whereby a molded rubber product can be obtained.

EXAMPLES

Next, Examples of the present invention will be specifically explained, but the present invention is not limited to these Examples.
<Main Starting Material>
[Acrylic Rubber] "AR 71" (an acrylic ester copolymer) manufactured by Zeon Corporation
[Silica] "Carplex #1120" ($SiO_2$) manufactured by Shionogi & Co., Ltd.
[Carbon Black] "MAF Seast 116" manufactured by Tokai Carbon Co., Ltd.
[Barium Sulfate] "Sedimentary Barium Sulfate 300" (Trademark) ($BaSO_4$) manufactured by Sakai Chemical Industry Co., Ltd.
[Magnesium Oxide] "Kyowamag #150" (MgO) manufactured by Kyowa Chemical Industry Co., Ltd
[Calcium Carbonate] "Hakuenka CC" (Trademark) ($CaCO_3$) manufactured by Shiraishi Kogyo Kaisha, Ltd.
[Aluminum Oxide] "Alumina A-12-40M" ($Al_2O_3$) manufactured by Showa Denko K. K.

Example 1

A composition obtained by mixing 100.0 parts by mass of acrylic rubber, 30.0 parts by mass of silica, 120.0 parts by mass of barium sulfate, 1.0 part by mass of Lunax S-30 (stearic acid manufactured by Kao Corporation), 2.0 parts by mass of Gleck G-8205 (an ester wax manufactured by DIC Corporation), 1.0 part by mass of CD (a substituted diphenyl amine manufactured by Ouchi Shinko Chemical Industrial Co., Ltd.), 0.3 parts by mass of Sulfax PMC (a surface-treated sulfur manufactured by Tsurumi Chemical Industry Co., Ltd.), 3.0 parts by mass of NS Soap (sodium stearate manufactured by Kao Corporation), 0.5 parts by mass of Nonsoul SK-1 (potassium stearate manufactured by NOF Corporation), and 5.0 parts by mass of RS-700 (a polyether-ester compound manufactured by Adeka Corporation) was kneaded in a mixing roll, and after that the mixture was subjected to primary vulcanization (at 170° C. for 12 minutes) into a sheet, thereby obtaining a rubber sheet (a molded rubber product) with a thickness of 2 mm.

Examples 2 to 19 and Comparative Examples 1 to 14

A rubber sheet (a molded rubber product) was obtained in the same manner as in Example 1, except that a composition was obtained by mixing starting materials shown in Tables 1 to 6 in a mixing ratio shown in those Tables.

"Satintone No. 5" in Table 2 is $SiO_2Al_2O_3$ (clay) manufactured by Tsuchiya Kaolin Industry Ltd., and "TSL 8331" in Table 2 is a silane coupling agent (γ-aminopropyltrimethoxysilane) manufactured by Toshiba Silicone Co., Ltd.

TABLE 1

| | | | Example 1 | Example 2 | Example 3 | Example 4 | Example 5 | Example 6 | Example 7 | Example 8 |
|---|---|---|---|---|---|---|---|---|---|---|
| Formulation of Composition | Acrylic Rubber | | 100.0 | 100.0 | 100.0 | 100.0 | 100.0 | 100.0 | 100.0 | 100.0 |
| | Silica | | 30.0 | 30.0 | 30.0 | 30.0 | — | — | — | — |
| | Carbon Black | | — | — | — | — | 30.0 | 30.0 | 30.0 | 30.0 |
| | First Compounding Ingredient | Barium Sulfate | 120.0 | — | — | — | 120.0 | — | — | — |
| | | Magnesium Oxide | — | 90.0 | — | — | — | 90.0 | — | — |
| | | Calcium Carbonate | — | — | 120.0 | — | — | — | 120.0 | — |
| | | Aluminum Oxide | — | — | — | 120.0 | — | — | — | 120.0 |
| | Lunax S-30 (stearic acid) | | 1.0 | 1.0 | 1.0 | 1.0 | 1.0 | 1.0 | 1.0 | 1.0 |
| | Gleck G-8205 (wax) | | 2.0 | 2.0 | 2.0 | 2.0 | 2.0 | 2.0 | 2.0 | 2.0 |
| | CD (substituted diphenyl amine) | | 1.0 | 1.0 | 1.0 | 1.0 | 1.0 | 1.0 | 1.0 | 1.0 |
| | Sulfax PMC (surface-treated sulfur) | | 0.3 | 0.3 | 0.3 | 0.3 | 0.3 | 0.3 | 0.3 | 0.3 |
| | NS Soap (Na stearate) | | 3.0 | 3.0 | 3.0 | 3.0 | 3.0 | 3.0 | 3.0 | 3.0 |
| | Nonsoul SK-1 (K stearate) | | 0.5 | 0.5 | 0.5 | 0.5 | 0.5 | 0.5 | 0.5 | 0.5 |
| | RS-700 | | 5.0 | 5.0 | 5.0 | 5.0 | 5.0 | 5.0 | 5.0 | 5.0 |
| | Satintone No. 5 | | — | — | — | — | — | — | — | — |
| Hardness (Shore A Hardness) | | | 66 | 73 | 66 | 72 | 61 | 75 | 69 | 74 |
| Tensile Strength (MPa) | | | 6.5 | 11.5 | 8.1 | 3.5 | 6.3 | 12.8 | 7.4 | 4.2 |
| Tensile Elongation (%) | | | 300 | 150 | 420 | 240 | 530 | 180 | 520 | 210 |

TABLE 1-continued

|  | Example 1 | Example 2 | Example 3 | Example 4 | Example 5 | Example 6 | Example 7 | Example 8 |
|---|---|---|---|---|---|---|---|---|
| Abrasion Evaluation | ○ | ○ | ○ | ○ | ○ | ○ | ○ | ○ |
| Processability Evaluation | ○ | Δ | ○ | Δ | ○ | Δ | ○ | Δ |

TABLE 2

|  |  |  | Comparative Example 1 | Comparative Example 2 | Comparative Example 3 | Example 18 | Example 19 |
|---|---|---|---|---|---|---|---|
| Formulation of Composition | Acrylic Rubber |  | 100.0 | 100.0 | 100.0 | 100.0 | 100.0 |
|  | Silica |  | 100.0 | — | 30.0 | 30.0 | 30.0 |
|  | Carbon Black |  | — | 80.0 | — | — | — |
|  | First Compounding Ingredient | Barium Sulfate | — | — | — | 120.0 | 120.0 |
|  |  | Magnesium Oxide | — | — | — | — | — |
|  |  | Calcium Carbonate | — | — | — | — | — |
|  |  | Aluminum Oxide | — | — | — | — | — |
|  | Lunax S-30 (stearic acid) |  | 1.0 | 1.0 | 1.0 | 1.0 | 1.0 |
|  | Gleck G-8205 (wax) |  | 2.0 | 2.0 | 2.0 | 2.0 | 2.0 |
|  | CD (substituted diphenyl amine) |  | 1.0 | 1.0 | 1.0 | 1.0 | 1.0 |
|  | Sulfax PMC (surface-treated sulfur) |  | 0.3 | 0.3 | 0.3 | 0.3 | 0.3 |
|  | NS Soap (Na stearate) |  | 3.0 | 3.0 | 3.0 | 3.0 | 3.0 |
|  | Nonsoul SK-1 (K stearate) |  | 0.5 | 0.5 | 0.5 | 0.5 | 0.5 |
|  | RS-700 |  | 5.0 | 5.0 | 5.0 | 5.0 | 5.0 |
|  | Satintone No. 5 |  | — | — | 120.0 | — | — |
|  | TSL 8331 (silane coupling agent) |  | — | — | — | 0.5 | 0.4 |
| Hardness (Shore A Hardness) |  |  | 90 | 78 | 79 | 63 | 72 |
| Tensile Strength (MPa) |  |  | 10.6 | 11.2 | 10.9 | 8.3 | 7.5 |
| Tensile Elongation (%) |  |  | 220 | 220 | 250 | 210 | 200 |
| Abrasion Evaluation |  |  | xx | xx | xx | Δ | ○ |
| Processability Evaluation |  |  | x | Δ | ○ | ○ | ○ |

TABLE 3

|  |  |  | Comparative Example 4 | Example 9 | Example 10 | Example 11 | Comparative Example 5 |
|---|---|---|---|---|---|---|---|
| Formulation of Composition | Acrylic Rubber |  | 100.0 | 100.0 | 100.0 | 100.0 | 100.0 |
|  | Silica |  | — | — | — | — | — |
|  | Carbon Black |  | — | — | — | — | — |
|  | First Compounding Ingredient | Barium Sulfate | 40.0 | 50.0 | 150.0 | 200.0 | 210.0 |
|  |  | Magnesium Oxide | — | — | — | — | — |
|  |  | Calcium Carbonate | — | — | — | — | — |
|  |  | Aluminum Oxide | — | — | — | — | — |
|  | Lunax S-30 (stearic acid) |  | 1.0 | 1.0 | 1.0 | 1.0 | 1.0 |
|  | Gleck G-8205 (wax) |  | 2.0 | 2.0 | 2.0 | 2.0 | 2.0 |
|  | CD (substituted diphenyl amine) |  | 1.0 | 1.0 | 1.0 | 1.0 | 1.0 |
|  | Sulfax PMC (surface-treated sulfur) |  | 0.3 | 0.3 | 0.3 | 0.3 | 0.3 |
|  | NS Soap (Na stearate) |  | 3.0 | 3.0 | 3.0 | 3.0 | 3.0 |
|  | Nonsoul SK-1 (K stearate) |  | 0.5 | 0.5 | 0.5 | 0.5 | 0.5 |
|  | RS-700 |  | 5.0 | 5.0 | 5.0 | 5.0 | 5.0 |
| Hardness (Shore A Hardness) |  |  | 28 | 30 | 41 | 46 | 46 |
| Tensile Strength (MPa) |  |  | 2.2 | 2.5 | 5.2 | 5.0 | 5.0 |

TABLE 3-continued

|  | Comparative Example 4 | Example 9 | Example 10 | Example 11 | Comparative Example 5 |
|---|---|---|---|---|---|
| Tensile Elongation (%) | 420 | 380 | 410 | 400 | 520 |
| Abrasion Evaluation | ○ | ○ | ○ | ○ | x |
| Processability Evaluation | x | Δ | ○ | ○ | Δ |

TABLE 4

|  |  |  | Comparative Example 6 | Example 12 | Example 13 | Example 14 | Comparative Example 7 |
|---|---|---|---|---|---|---|---|
| Formulation of Composition | Acrylic Rubber |  | 100.0 | 100.0 | 100.0 | 100.0 | 100.0 |
|  | Silica |  | 25.0 | 25.0 | 25.0 | 25.0 | 25.0 |
|  | Carbon Black |  | — | — | — | — | — |
|  | First Compounding Ingredient | Barium Sulfate | 40.0 | 50.0 | 150.0 | 200.0 | 210.0 |
|  |  | Magnesium Oxide | — | — | — | — | — |
|  |  | Calcium Carbonate | — | — | — | — | — |
|  |  | Aluminum Oxide | — | — | — | — | — |
|  | Lunax S-30 (stearic acid) |  | 1.0 | 1.0 | 1.0 | 1.0 | 1.0 |
|  | Gleck G-8205 (wax) |  | 2.0 | 2.0 | 2.0 | 2.0 | 2.0 |
|  | CD (substituted diphenyl amine) |  | 1.0 | 1.0 | 1.0 | 1.0 | 1.0 |
|  | Sulfax PMC (surface-treated sulfur) |  | 0.3 | 0.3 | 0.3 | 0.3 | 0.3 |
|  | NS Soap (Na stearate) |  | 3.0 | 3.0 | 3.0 | 3.0 | 3.0 |
|  | Nonsoul SK-1 (K stearate) |  | 0.5 | 0.5 | 0.5 | 0.5 | 0.5 |
|  | RS-700 |  | 5.0 | 5.0 | 5.0 | 5.0 | 5.0 |
| Hardness (Shore A Hardness) |  |  | 52 | 54 | 64 | 65 | 70 |
| Tensile Strength (MPa) |  |  | 8.2 | 6.9 | 6.0 | 6.5 | 5.6 |
| Tensile Elongation (%) |  |  | 300 | 280 | 300 | 300 | 310 |
| Abrasion Evaluation |  |  | x | ○ | ○ | ○ | x |
| Processability Evaluation |  |  | ○ | ○ | ○ | ○ | Δ |

TABLE 5

|  |  |  | Comparative Example 8 | Example 15 | Example 16 | Example 17 | Comparative Example 9 |
|---|---|---|---|---|---|---|---|
| Formulation of Composition | Acrylic Rubber |  | 100.0 | 100.0 | 100.0 | 100.0 | 100.0 |
|  | Silica |  | 50.0 | 50.0 | 50.0 | 50.0 | 50.0 |
|  | Carbon Black |  | — | — | — | — | — |
|  | First Compounding Ingredient | Barium Sulfate | 40.0 | 50.0 | 150.0 | 200.0 | 210.0 |
|  |  | Magnesium Oxide | — | — | — | — | — |
|  |  | Calcium Carbonate | — | — | — | — | — |
|  |  | Aluminum Oxide | — | — | — | — | — |
|  | Lunax S-30 (stearic acid) |  | 1.0 | 1.0 | 1.0 | 1.0 | 1.0 |
|  | Gleck G-8205 (wax) |  | 2.0 | 2.0 | 2.0 | 2.0 | 2.0 |
|  | CD (substituted diphenyl amine) |  | 1.0 | 1.0 | 1.0 | 1.0 | 1.0 |
|  | Sulfax PMC (surface-treated sulfur) |  | 0.3 | 0.3 | 0.3 | 0.3 | 0.3 |
|  | NS Soap (Na stearate) |  | 3.0 | 3.0 | 3.0 | 3.0 | 3.0 |
|  | Nonsoul SK-1 (K stearate) |  | 0.5 | 0.5 | 0.5 | 0.5 | 0.5 |
|  | RS-700 |  | 5.0 | 5.0 | 5.0 | 5.0 | 5.0 |
| Hardness (Shore A Hardness) |  |  | 73 | 73 | 78 | 83 | 84 |
| Tensile Strength (MPa) |  |  | 9.1 | 8.8 | 6.1 | 4.9 | 6.5 |
| Tensile Elongation (%) |  |  | 260 | 260 | 250 | 240 | 250 |

TABLE 5-continued

|  | Comparative Example 8 | Example 15 | Example 16 | Example 17 | Comparative Example 9 |
|---|---|---|---|---|---|
| Abrasion Evaluation | x | ○ | ○ | ○ | xx |
| Processability Evaluation | ○ | ○ | ○ | ○ | Δ |

TABLE 6

| | | | Comparative Example 10 | Comparative Example 11 | Comparative Example 12 | Comparative Example 13 | Comparative Example 14 |
|---|---|---|---|---|---|---|---|
| Formulation of Composition | Acrylic Rubber | | 100.0 | 100.0 | 100.0 | 100.0 | 100.0 |
| | Silica | | 60.0 | 60.0 | 60.0 | 60.0 | 60.0 |
| | Carbon Black | | — | — | — | — | — |
| | First Compounding Ingredient | Barium Sulfate | 40.0 | 50.0 | 150.0 | 200.0 | 210.0 |
| | | Magnesium Oxide | — | — | — | — | — |
| | | Calcium Carbonate | — | — | — | — | — |
| | | Aluminum Oxide | — | — | — | — | — |
| | Lunax S-30 (stearic acid) | | 1.0 | 1.0 | 1.0 | 1.0 | 1.0 |
| | Gleck G-8205 (wax) | | 2.0 | 2.0 | 2.0 | 2.0 | 2.0 |
| | CD (substituted diphenyl amine) | | 1.0 | 1.0 | 1.0 | 1.0 | 1.0 |
| | Sulfax PMC (surface-treated sulfur) | | 0.3 | 0.3 | 0.3 | 0.3 | 0.3 |
| | NS Soap (Na stearate) | | 3.0 | 3.0 | 3.0 | 3.0 | 3.0 |
| | Nonsoul SK-1 (K stearate) | | 0.5 | 0.5 | 0.5 | 0.5 | 0.5 |
| | RS-700 | | 5.0 | 5.0 | 5.0 | 5.0 | 5.0 |
| Hardness (Shore A Hardness) | | | 81 | — | 82 | — | 85 |
| Tensile Strength (MPa) | | | 8.7 | — | 7.3 | — | 6.2 |
| Tensile Elongation (%) | | | 250 | — | 230 | — | 210 |
| Abrasion Evaluation | | | x | x | x | xx | xx |
| Processability Evaluation | | | ○ | ○ | ○ | ○ | x |

Evaluations of each rubber sheet obtained as above were performed in accordance with the following evaluation methods. The results are shown in Tables 1 to 6.

<Measurement Method of Tensile Strength>

A tensile strength (MPa) of a No. 3 dumbbell specimen of the rubber sheet was measured in accordance with JIS K 6251.

<Measurement Method of Tensile Elongation>

An elongation (%) of a No. 3 dumbbell specimen of the rubber sheet was measured in accordance with JIS K 6251.

<Measurement Method of Durometer Hardness (Shore A hardness)>

A durometer hardness (Shore A hardness) of the rubber sheet was measured in accordance with JIS K 6253.

<Evaluation Method of Abrasion>

Each rubber sheet was subjected to an abrasion test using a ring on disk tester under testing conditions of a load of 4 N, a frequency of 5000 rpm for 30 minutes to determine an average abrasion (an average abrasion thickness) (mm) of the rubber sheet. Evaluation was performed based on the following criteria:

(Criteria)

"○" Average abrasion of 0.2 mm or more and less than 0.5 mm

"Δ" Average abrasion of 0.1 mm or more and less than 0.2 mm

"x" Average abrasion of 0.05 mm or more and less than 0.1 mm

"xx" Average abrasion of less than 0.05 mm

<Evaluation Method of Processability>

Kneadability when the composition was kneaded in the mixing roll and moldability when the kneaded composition was formed into the sheet were determined, and evaluation was performed based on the following criteria:

(Criteria)

"○" Good kneadability and good moldability

"Δ" Almost good kneadability and almost good moldability, though it takes a little time (burr is occasionally generated, but there would be no problem in actual productions).

"X" Poor kneadability and poor moldability (there are problems in any of adhesion, twining, scorch due to heat, cracking and sticking in mold, and there would be a problem in actual productions).

As apparent from Tables, the rubber sheets of Examples 1 to 19 of the present invention can be sufficiently abraded by sliding them.

A seal for a bearing was produced using each rubber sheet of Example 1 and Comparative Example 14 and was applied to a rolling bearing. The bearing was run at a radial load of 500 N and a rotating speed of 4000 rpm for one hour, and then once stopped. Thereafter, the bearing was rotated at a rotating speed of 4000 rpm again, and a sheet torque was measured when the bearing temperature reached 30° C. The torque was 0.37 N·m in Comparative Example 14; whereas it was 0.08 N·m in Example 1. Thus, it was found that remarkable reduction of the torque can be realized. When a torque of a seal for a general contactless bearing was measured in the same manner as above, the torque was 0.09 N·m. The torque of 0.08

N·m obtained in Example 1 was almost the same as the torque of the seal for the general contactless bearing.

INDUSTRIAL APPLICABILITY

The rubber composition according to the present invention is preferably used as, for example, sealing materials for various bearings such as sealing materials for a bearing in a transmission system of a car, but the applications of the invention are not particularly limited to this application.

The invention claimed is:

1. A rubber composition comprising a first compounding ingredient which is one or more kinds selected from the group consisting of calcium carbonate, magnesium oxide, aluminum oxide and barium sulfate in an amount of 50 to 200 parts by mass based on 100 parts by mass of an acrylic rubber, wherein the composition does not comprise carbon black nor a silica.

2. A rubber composition comprising a first compounding ingredient which is one or more kinds selected from the group consisting of calcium carbonate, magnesium oxide, aluminum oxide and barium sulfate in an amount of 50 to 200 parts by mass based on 100 parts by mass of an acrylic rubber, and a second compounding ingredient which is one or two kinds selected from the group consisting of carbon black and a silica in an amount of more than 0 parts by mass and 50 parts by mass or lower.

3. The rubber composition according to claim 1, wherein barium sulfate is used as the first compounding ingredient.

4. A molded rubber product which is formed by cross-linking the rubber composition according to claim 1.

5. A seal for a bearing which is formed by cross-linking the rubber composition according to claim 1.

6. The rubber composition according to claim 2, wherein barium sulfate is used as the first compounding ingredient.

7. A molded rubber product which is formed by cross-linking the rubber composition according to claim 2.

8. A seal for a bearing which is formed by cross-linking the rubber composition according to claim 2.

9. The rubber composition according to claim 1, further comprising an epoxy cross-linking agent and/or a soap-sulfur cross-linking agent.

10. The rubber composition according to claim 2, further comprising an epoxy cross-linking agent and/or a soap-sulfur cross-linking agent.

* * * * *